United States Patent
Dong et al.

(10) Patent No.: US 12,072,204 B2
(45) Date of Patent: Aug. 27, 2024

(54) LANDING ZONE EVALUATION

(71) Applicant: Aurora Flight Sciences Corporation, Manassas, VA (US)

(72) Inventors: Yi Dong, Cambridge, MA (US); Mustafa Hasekioglu, Boston, MA (US)

(73) Assignee: The Boeing Company, Arlington, VA (US)

( * ) Notice: Subject to any disclaimer, the term of this patent is extended or adjusted under 35 U.S.C. 154(b) by 377 days.

(21) Appl. No.: 17/464,514

(22) Filed: Sep. 1, 2021

(65) Prior Publication Data

US 2022/0136860 A1 May 5, 2022

Related U.S. Application Data (60) Provisional application No. 63/093,766, filed on Oct. 19, 2020.

(51) Int. Cl.
*G01C 23/00* (2006.01)
*G01C 21/00* (2006.01)
(Continued)

(52) U.S. Cl.
CPC .......... *G01C 23/00* (2013.01); *G01C 21/005* (2013.01); *G01C 21/20* (2013.01); *G06T 17/05* (2013.01);
(Continued)

(58) Field of Classification Search
CPC ...... G01C 23/00; G01C 21/005; G01C 21/20; G01C 1/00; G06T 17/05; G06V 10/34;
(Continued)

(56) References Cited

U.S. PATENT DOCUMENTS

2014/0297068 A1 10/2014 Revell et al.
2016/0114905 A1 4/2016 Derenick et al.
(Continued)

FOREIGN PATENT DOCUMENTS

CN 104899554 9/2015
CN 111222511 6/2020
(Continued)

OTHER PUBLICATIONS

Extended European Search Report for EP Patent Application No. 21192624.1 dated Feb. 16, 2022.
(Continued)

*Primary Examiner* — Yonel Beaulieu
(74) *Attorney, Agent, or Firm* — Kunzler Bean & Adamson (57) ABSTRACT

Disclosed herein is a system that comprises one or more imaging sensors coupled to an aircraft and one or more navigation sensors coupled to the aircraft proximate to the one or more imaging sensors. The system further comprises an imaging module configured to capture images of a landing zone for the aircraft while the aircraft is in flight. The system additionally comprises a location determining module configured to associate a corresponding one of a plurality of location data with each one of the captured images. The plurality of location data is determined using one or more navigation sensors coupled to the aircraft. The system also comprises an object-identifying module configured to identify and locate one or more objects within the landing zone, relative to the aircraft, using the captured images and the location data associated with the captured images.

20 Claims, 7 Drawing Sheets

(51) Int. Cl.
| | |
|---|---|
| *G01C 21/20* | (2006.01) |
| *G06T 17/05* | (2011.01) |
| *G06V 10/34* | (2022.01) |
| *G06V 20/17* | (2022.01) |
| *G06V 20/58* | (2022.01) |
| *H04N 23/51* | (2023.01) |
| *H04N 23/90* | (2023.01) |

(52) U.S. Cl.
CPC .............. *G06V 10/34* (2022.01); *G06V 20/17* (2022.01); *G06V 20/58* (2022.01); *H04N 23/90* (2023.01); *H04N 23/51* (2023.01)

(58) Field of Classification Search
CPC ........ G06V 20/17; G06V 20/58; H04N 23/90; H04N 23/51; G08G 5/0086; G08G 5/025; G08G 5/0021; G08G 5/0078; G08G 5/045; B64C 39/02; B64C 39/024; G06K 9/00; B64D 47/08
See application file for complete search history.

(56) References Cited

U.S. PATENT DOCUMENTS

| | | |
|---|---|---|
| 2016/0137309 A1 | 5/2016 | Franklin et al. |
| 2017/0023473 A1 | 1/2017 | Wegner |
| 2018/0082438 A1 | 3/2018 | Simon |
| 2019/0019423 A1 | 1/2019 | Choi et al. |
| 2019/0066522 A1 | 2/2019 | Sweet et al. |
| 2019/0080142 A1* | 3/2019 | Abeywardena ........ G01C 21/32 |
| 2019/0138029 A1 | 5/2019 | Ryll et al. |
| 2019/0392719 A1 | 12/2019 | Parker et al. |
| 2020/0026902 A1* | 1/2020 | Abeywardena ........ G01C 21/32 |
| 2020/0273354 A1 | 8/2020 | Jenkins |
| 2020/0326418 A1 | 10/2020 | Keijer et al. |

FOREIGN PATENT DOCUMENTS

| | | |
|---|---|---|
| EP | 3447527 | 2/2019 |
| WO | 2012122588 | 9/2012 |
| WO | 2019093885 | 5/2019 |

OTHER PUBLICATIONS

Extended European Search Report for EP Patent Application No. 21193009.4 dated Feb. 16, 2022.
Chen et al., Vision-Based Horizon Detection and Target Tracking for UAVs, 2011, pp. 310-319, ISVC 2011, Part II, LNCS 6939, published by Springer-Verlag Berlin Heidelberg.
Driessen, J., Object Tracking in a Computer Vision based Autonomous See-and-Avoid System for Unmanned Aerial Vehicles, 2004, pp. 1-68, Department of Numerical Analysis and Computer Science Royal Institute of Technology, Stockholm, Sweden.
Al-Kaff et al, Obstacle Detection and Avoidance System Based on Monocular Camera and Size Expansion Algorithm for UAVs, 2017, pp. 1-22, MDPI, 17, 1061.
Opromolla et al., Airborne Visual Detection and Tracking of Cooperative UAVs Exploiting Deep Learning, 2019, pp. 2-27, MDPI, 19, 4332.
DeCroon et al., Sky Segmentation Approach to Obstacle Avoidance, 2011, IEEE Aerospace Conference Proceedings, pp. 1-32. (Year: 2011).
Opromolla et al, Airborne Visual Detection and Tracking of Cooperative UAVs Exploiting Deep Learning, 2019, Sensors, 19(4332), 1-27. (Year: 2019).
Decroon et al., Sky Segmentation Approach to Obstacle Avoidance, IEEE Aerospace Conference Proceedings, Apr. 2011, pp. 1-31.
Opromolla et al., Airborne Visual Detection and Tracking of Cooperative UAVs Exploiting Deep Learning, Sensors, 2019, pp. 1-27, vol. 19, issue 4332.
EPO Communication concerning EP Patent Application No. 21193009.4 dated Jan. 24, 2024.
Ahmad et al., Horizon line detection using supervised learning and edge cues, 2019, Computer Vision and Image Understanding, 191 (2020): 102879, pp. 1-16, Elsevier Inc.

* cited by examiner

LANDING ZONE EVALUATION

FIELD

This disclosure relates generally to aircraft, and more particularly to evaluating a landing zone for an aircraft.

BACKGROUND

Assumptions for landing zones for aircraft such as airplanes and helicopters are that the landing zones are flat and generally free of obstacles. In practice, however, there may obstacles or objects in the landing zone that could impair or prevent the aircraft from landing in the landing zone. In a worst case scenario, the obstacles in the landing zone may not be detected could cause damage to the aircraft and/or bodily harm to passengers in the aircraft.

SUMMARY

The subject matter of the present application has been developed in response to the present state of the art, and in particular, in response to the problems and disadvantages associated with conventional methods for landing zone evaluation. Accordingly, the subject matter of the present application has been developed to evaluate landing zones that overcomes at least some of the above-discussed shortcomings of prior art techniques.

Disclosed herein is a system. The system comprises one or more imaging sensors coupled to an aircraft. The system also comprises one or more navigation sensors coupled to the aircraft proximate to the one or more imaging sensors. The system further comprises an imaging module configured to capture images of a landing zone for the aircraft while the aircraft is in flight. The captured images are captured using the one or more imaging sensors. The system additionally comprises a location determining module configured to associate a corresponding one of a plurality of location data with each one of the captured images. The plurality of location data is determined using the one or more navigation sensors coupled to the aircraft. The system also comprises an object-identifying module configured to identify and locate one or more objects within the landing zone, relative to the aircraft, using the captured images and the location data associated with the captured images.

Further disclosed herein is a method. The method comprises capturing images of a landing zone for an aircraft while the aircraft is in flight. The captured images are captured using one or more imaging sensors coupled to the aircraft. The method also comprises associating a corresponding one of a plurality of location data with each one of the captured images. The plurality of location data is determined using one or more navigation sensors coupled to the aircraft. The method further comprises identifying and locating one or more objects within the landing zone, relative to the aircraft, using the captured images and the location data associated with the captured images.

Additionally, disclosed herein is a computer program product comprising a computer readable storage medium having program code embodied therein. The program code is executable by a processor for receiving, from one or more imaging sensors coupled to an aircraft, images of a landing zone for the aircraft. The images have been captured using the one or more imaging sensors while the aircraft is in flight. The program code is also executable by a processor for associating a corresponding one of a plurality of location data with each one of the captured images. The plurality of location data is determined using one or more navigation sensors coupled to the aircraft. The program code is further executable by a processor for identifying and locating one or more objects within the landing zone, relative to the aircraft, using the captured images and the location data associated with the captured images.

The described features, structures, advantages, and/or characteristics of the subject matter of the subject disclosure may be combined in any suitable manner in one or more examples and/or implementations. In the following description, numerous specific details are provided to impart a thorough understanding of examples of the subject matter of the subject disclosure. One skilled in the relevant art will recognize that the subject matter of the subject disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the subject disclosure. The features and advantages of the subject matter of the subject disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the subject disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject disclosure, however, absent an express correlation to indicate otherwise, an implementation may be associated with one or more embodiments.

Figure 1:
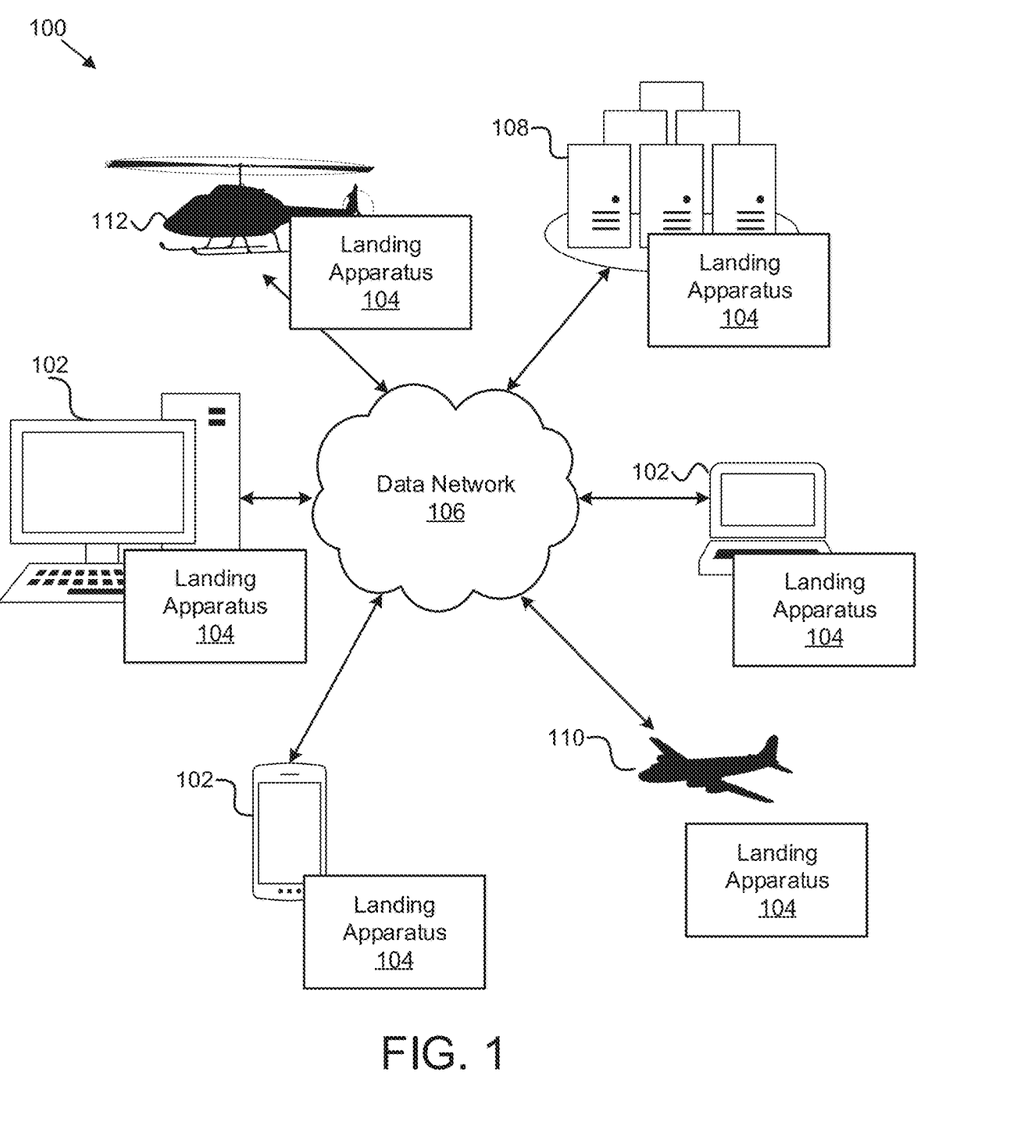
FIG. 1 is a schematic block diagram of a system for landing zone evaluation, according to one or more examples of the subject disclosure.

FIG. 1 is a schematic block diagram of a system 100 for landing zone evaluation, according to one or more examples of the subject disclosure. As described herein, the system 100 is a multi-sensor based landing zone evaluation system that is designed to assist aircraft landing (manually or autonomously). Based on the data from various sensors (e.g., imaging and/or navigation) placed on an aircraft, a high resolution digital surface model of a landing zone is generated via sensor fusion. From the generated digital surface model of the landing zone, series semantic representation is generated to evaluate the terrain condition for landing (e.g., obstacle above ground, surface roughness, surface normal, and/or the like). Navigation instructions and/or recommendations can be generated and provided to an autonomous aircraft 110, 112 (e.g., a drone) and/or a pilot (on board or remote) for avoiding any objects, hazards, or other structures within the landing zone while landing the aircraft 110, 112 without prior knowledge of the landing zone area.

The system 100 includes one or more information handling devices 102, one or more message apparatuses 104, one or more data networks 106, one or more servers 108, and one or more aircraft 110, 112. Even though a specific number of information handling devices 102, message apparatuses 104, data networks 106, one or more servers 108, and aircraft 110, 1112 are depicted in FIG. 1, one of skill in the art will recognize, in light of this disclosure, that any number of information handling devices 102, message apparatuses 104, data networks 106, servers 108, and aircraft 110, 112 can be included in the system 100.

The information handling devices 102 of the system 100 can include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 can be located on the aircraft 110, 112 and are communicatively coupled to one or more other information handling devices 102, one or more servers 108, and/or on one or more aircraft 110 over the data network 106, described below. The information handling devices 102 can include processors, processor cores, and/or the like that are configured to execute various programs, program code, systems, applications, instructions, functions, and/or the like for sending and receiving messages, comparing information, storing and querying data in databases, and/or the like. In certain embodiments, program code can be executed on a graphics processing unit ("GPU").

In one embodiment, the landing apparatus 104 is configured to capture images of a landing zone for an aircraft 110, 112 in real-time while the aircraft 110, 112 is in flight. The images can be captured using one or more imaging sensors that are coupled to the aircraft 110, 112. In further embodiments, the landing apparatus 104 is configured to associate a corresponding one of a plurality of location data with each one of the captured images. The plurality of location data can be determined using one or more navigation sensors coupled to the aircraft 110, 112. In certain embodiments, the landing apparatus 104 is configured to identify and locate one or more objects within the landing zone, relative to the aircraft 110, 112, using the captured images and the location data associated with the captured images. The landing apparatus 104, including its various modules, is described in more detail below with reference to FIG. 2.

In various embodiments, the landing apparatus 104 is located on an aircraft 110, 112 as part of a flight information system or other computing system associated with the aircraft 110, 112; is located on or is communicatively coupled to a ground-based computing system; and/or some combination of the foregoing.

The landing apparatus 104, in some embodiments, is embodied as a hardware appliance that can be installed or deployed on an information handling device 102, on a server 108, on an aircraft 110, 112, and/or elsewhere on the data network 106. In certain examples, the landing apparatus 104 includes a hardware device such as a secure hardware dongle or other hardware appliance device (e.g., a set-top box, a network appliance, or the like) that attaches to a device, a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the landing apparatus 104 includes a power interface, a wired and/or wireless network interface, a graphical interface that attaches to a display, and/or a semiconductor integrated circuit device as described below, configured to perform the functions described herein with regard to the landing apparatus 104.

The landing apparatus 104, in some embodiments, includes a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like, in some examples. In one embodiment, the landing apparatus 104 is mounted on a printed circuit board with one or more electrical lines or connections (e.g., to volatile memory, a non-volatile storage medium, a network interface, a peripheral device, a graphical/display interface, or the like). The hardware appliance includes one or more pins, pads, or other electrical connections configured to send and receive data (e.g., in communication with one or more electrical lines of a printed circuit board or the like), and one or more hardware circuits and/or other electrical circuits configured to perform various functions of the landing apparatus 104 in some examples.

The semiconductor integrated circuit device or other hardware appliance of the landing apparatus 104, in certain embodiments, includes and/or is communicatively coupled to one or more volatile memory media, which can include but is not limited to random access memory ("RAM"), dynamic RAM ("DRAM"), cache, or the like. In one embodiment, the semiconductor integrated circuit device or other hardware appliance of the landing apparatus 104 includes and/or is communicatively coupled to one or more non-volatile memory media, which can include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

In another embodiment, the landing apparatus 104 consists of software services and software applications. Landing apparatuses, systems, modules, and/or the like can execute in memory on another device and communicate with the illustrated computing systems, flight information systems, aircraft 110, 112, or other information handling devices 102 via inter-computer communications hosted for processing images, location data, and/or the like for evaluating a landing zone.

The data network 106, in one embodiment, includes a digital communication network that transmits digital communications. The data network 106 includes a wireless network, such as a wireless cellular network, a local wireless network, such as a Wi-Fi network, a Bluetooth® network, a near-field communication ("NFC") network, an ad hoc network, and/or the like, in certain examples. The data network 106 includes a wide area network ("WAN"), a storage area network ("SAN"), a local area network (LAN), an optical fiber network, the internet, or other digital communication network, in certain examples. In some examples, the data network 106 includes two or more networks. In one example, the data network 106 includes one or more servers, routers, switches, and/or other networking equipment. In some examples, the data network 106 includes one or more computer readable storage media, such as a hard disk drive, an optical drive, non-volatile memory, RAM, or the like.

The wireless connection is a mobile telephone network in one example. The wireless connection employs a Wi-Fi network based on any one of the Institute of Electrical and Electronics Engineers ("IEEE") 802.11 standards in one example. Alternatively, the wireless connection is a Bluetooth® connection in certain examples. In addition, the wireless connection employs a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™ in various examples.

Alternatively, the wireless connection can employ a ZigBee® connection based on the IEEE 802 standard. In one embodiment, the wireless connection employs a Z-Wave® connection as designed by Sigma Designs®. Alternatively, the wireless connection can employ an ANT® and/or ANT+® connection as defined by Dynastream® Innovations Inc. of Cochrane, Canada.

The wireless connection can be an infrared connection including connections conforming at least to the Infrared Physical Layer Specification ("IrPHY") as defined by the Infrared Data Association® ("IrDA"®). Alternatively, the wireless connection can be a cellular telephone network communication. All standards and/or connection types include the latest version and revision of the standard and/or connection type as of the filing date of this application.

The one or more servers 108, in one embodiment, are embodied as blade servers, mainframe servers, tower servers, rack servers, and/or the like. The one or more servers 108 are configured as mail servers, web servers, application servers, FTP servers, media servers, data servers, web servers, file servers, virtual servers, and/or the like in some examples. The one or more servers 108 are communicatively coupled (e.g., networked) over a data network 106 to one or more information handling devices 102 in certain examples. The one or more servers 108 store data in data structures such as databases, data repositories, or the like in some examples.

In certain embodiments, the one or more servers 108 are located on an aircraft 110, 112, on the ground as part of a ground-based computing system, and/or the like. The one or more servers 108 can include storage for storing image, video, and/or location data, and/or executable code (e.g., programs, applications, algorithms, libraries, or the like) for processing video/image data for identifying/locating objects within a landing zone for an aircraft 110, 112.

In one embodiment, an aircraft 110 can include a fixed-wing aircraft such as an airplane, a glider, a drone, and/or the like. Another type of aircraft 112 can include a rotary-wing aircraft (rotorcraft) such as a helicopter, a gyrocopter, a gyrodyne, a rotor kite, and/or the like. In either case, the aircraft 110, 112 can be operated by a pilot on board the aircraft 110, 112 or can be controlled remotely or autonomously using an onboard flight control system.

Figure 3:
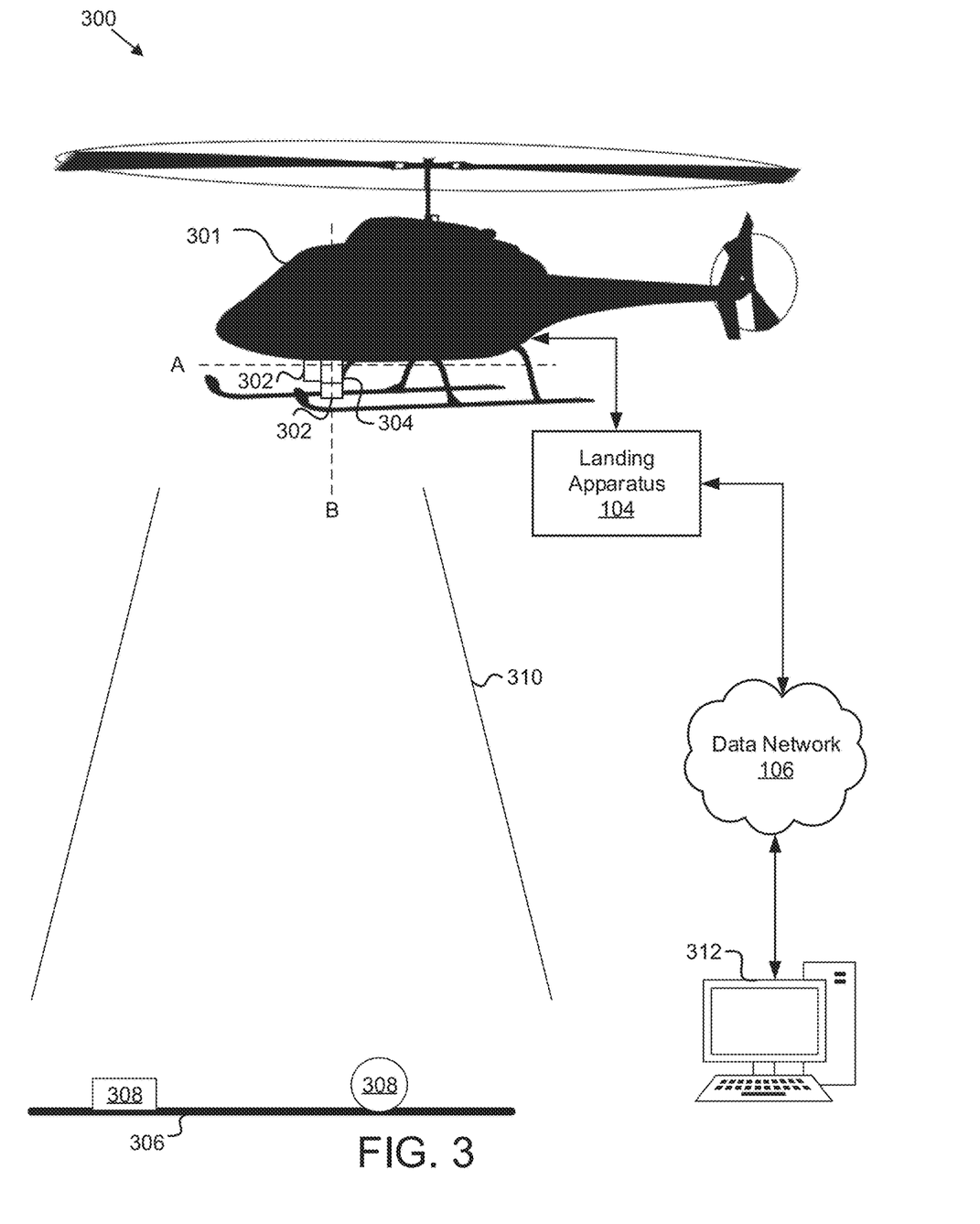
FIG. 3 depicts an example embodiment of a system for landing zone evaluation, according to one or more examples of the subject disclosure.

In one embodiment, as depicted in more detail in FIG. 3, the aircraft 110, 112 includes one or more imaging sensors that are coupled to the aircraft 110, 112. The imaging sensors can include electro-optical cameras (e.g., stereo EO cameras), light detection and ranging ("LIDAR") sensors, and/or the like. For simplicity, the subject matter disclosed herein will refer to the imaging sensors as LIDAR sensors/cameras, but one of skill in the art will recognize various imaging sensors/cameras that could be used separately or in conjunction with a LIDAR camera. The imaging sensors can be placed on the aircraft 110, 112 at locations that minimize error, disturbance, distortion, or the like due to the motion of the aircraft 110, 112.

In further embodiments, the aircraft 110, 112 includes navigation sensors, location sensors, position sensors, and/or the like that are coupled to the aircraft 110, 112, at a location that is proximate to the imaging sensors. As used herein, a navigation sensor can refer to a navigation device that uses a computer, motion sensors (e.g., accelerometers) and rotation sensors (e.g., gyroscopes) to continuously calculate by dead reckoning the position, the orientation, and the velocity (direction and speed of movement) of a moving object. The navigation sensors can include an inertial navigation system ("INS"), global positioning system ("GPS") sensors, an altimeter, a gyroscope, a barometer, speedometers, and/or other location or positioning sensors that are capable of determining, estimating, calculating, and/or the like the position, location, movement, direction, and/or the like of an aircraft 110, 112 relative to the ground (e.g., a landing zone), relative to objects on the ground, relative to other aircraft 110, 112, and/or the like while the aircraft 110, 112 is in flight.

In certain embodiments, each of the imaging sensors is coupled to the aircraft 110, 112 adjacent to a corresponding navigation sensor. For instance, an imaging sensor and a corresponding navigation sensor can be located together within the same housing that is coupled to the aircraft 110, 112 (e.g., to an underside of the aircraft 110, 112). In such an embodiment, the imaging sensor and the corresponding navigation sensor are located no more than 0.5 meters apart from one another.

In certain embodiments, the imaging sensor and the navigation sensor are communicatively or operably coupled such that when an image is captured with the imaging sensor, location or positioning data is captured generally at the same time so that the captured image can be associated with the captured location data. In some embodiments, the aircraft 110, 112 includes at least two imaging sensors and at least two corresponding navigation sensors. In one embodiment, at least one imaging sensor is located on an underside of the aircraft 110, 112 and oriented along a horizontal plane and another at least one imaging sensor is located on an underside of the aircraft 110, 112 and oriented along a vertical plane, which can provide a view of the landing zone as the aircraft 110, 112 approaches and is located above the landing zone.

In some embodiments, a number and an orientation of the one or more imaging sensors is determined based on one or more specifications of the aircraft 110, 112. In some embodiments, the one or more specifications of the aircraft 110, 112 include a type of the aircraft 110, 112, a size of the aircraft 110, 112, a shape of the aircraft 110, 112, and a configuration of a landing gear for the aircraft 110, 112. For example, larger aircraft 110, 112 can allow for more imaging sensors and navigation sensors than smaller aircraft 110, 112. In another example, imaging and navigation sensors can be placed at locations on the aircraft 110, 112 based on the shape and/or body configuration of the aircraft 110, 112. In this manner, various aircraft makes and models can be supported and the imaging sensor settings can be adjusted (e.g., resolution, frame rate, or the like) based on the aircraft specifications.

Figure 2:
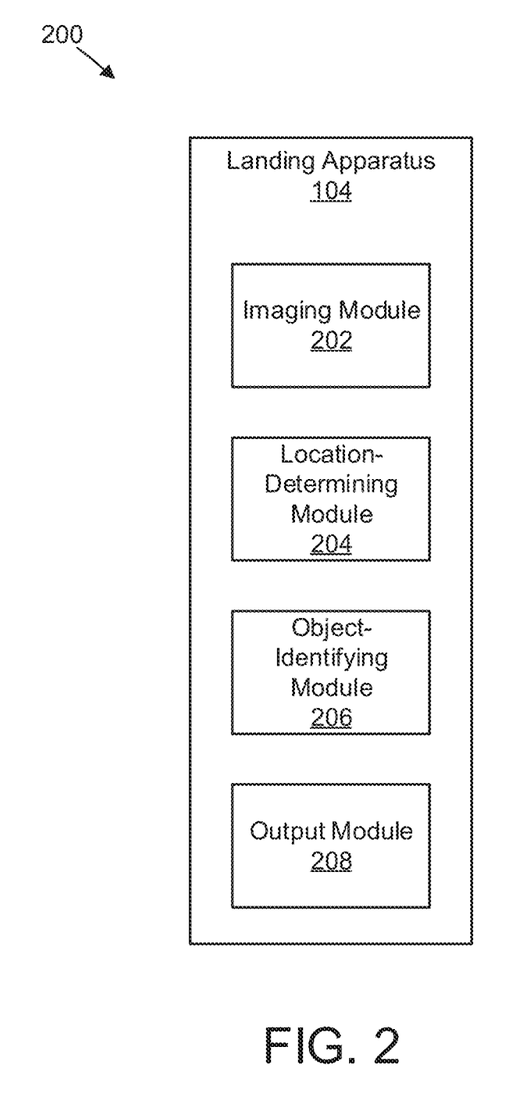
FIG. 2 is a schematic block diagram of an apparatus for landing zone evaluation, according to one or more examples of the subject disclosure.

FIG. 2 is a schematic block diagram of an apparatus 200 for landing zone evaluation, according to one or more examples of the subject disclosure. In one embodiment, the apparatus 200 includes an instance of a landing apparatus 104. The landing apparatus 104, in certain embodiments, includes an imaging module 202, a location-determining module 204, an object-identifying module 206, and an output module 208, which are described in more detail below.

The imaging module 202, in one embodiment, is configured to capture images, using one or more imaging sensors coupled to an aircraft 110, 112, of a landing zone for an aircraft 110, 112 in real-time while the aircraft 110, 112 is in flight. A landing zone, as used herein, can refer to an area on the ground configured for an aircraft 110, 112 that is in flight to land, e.g., a runway, an emergency landing location, and/or helicopter pad.

The imaging module 202 can capture images on a continuous basis, periodically, at predetermined intervals, or the like while the aircraft 110, 112 is in flight. For example, the imaging module 202 can capture images using an imaging sensor in real-time (e.g., at 30 frames per second, at 60 frames per second, or the like), every millisecond, every microsecond, every second, every 5 seconds, every 10 seconds, every 30 seconds, every minute, and/or the like.

In certain embodiments, the rate at which the imaging module 202 captures images is determined based on the location of the aircraft 110, 112 (e.g., as the aircraft 110, 112 gets closer to the landing zone, the imaging module 202 can increase the rate at which images are captured), the specifications of the imaging sensors (e.g., the rate at which the imaging sensors can capture images).

In some embodiments, the imaging module 202 does not capture images using the imaging sensors until the aircraft 110, 112 is in a certain mode (e.g., a landing mode or detecting that a landing gear is deployed), is within a predetermined proximity of a landing zone (e.g., within 5 miles), detects that the aircraft 110, 112 is beginning to land (e.g., detecting that the altitude or elevation of the aircraft is decreasing or that the speed of the aircraft 110, 112 is decreasing), detects that the aircraft has reached its destination (e.g., based on a flight path and the location of the aircraft 110, 112), and/or the like.

The location-determining module 204, in certain embodiments, is configured to associate a corresponding one of a plurality of location data, which is determined using one or more navigation sensors coupled to the aircraft 110, 112, with each one of the captured images. For instance, the location-determining module 204 can read, access, or otherwise determine location data from an inertial navigation system (INS) sensor associated with (e.g., within the same housing as) an imaging sensor at generally the same time as when the imaging module 202 captures an image using the imaging sensor.

For example, the location-determining module 204 can align LIDAR images with INS location data in temporal space by attaching, assigning, correlating, or the like the temporal nearest INS signals to the LIDAR images.

The object-identifying module 206, in one embodiment, is configured to identify and locate one or more objects within the landing zone, relative to the aircraft, using the captured images and the location data associated with the captured images. The object-identifying module 206, for example, can process a series of LIDAR images using various image processing algorithms, processes, methods, techniques, programs, and/or the like to identify objects that can be present within the landing zone.

In one embodiment, the object-identifying module 206 applies a point-cloud transformation to the captured images, e.g., LIDAR images, to generate a point cloud. As used herein, a point cloud can refer to a set of data points in space. In such an embodiment, the object-identifying module 206 converts the image data that the imaging module 202 captures using the imaging sensors from a coordinate frame of the one or more imaging sensors to a coordinate frame of the aircraft 110, 112.

In further embodiments, the object-identifying module 206 filters the generated point cloud to generate a cleaned point cloud by identifying and removing statistical outlier data from the point cloud. For instance, the object-identifying module 206 can apply a statistical outlier removal algorithm to the generated point cloud to remove noisy points from the generated point cloud to create the cleaned point cloud.

In various embodiments, the object-identifying module 206 down-samples the cleaned point cloud. For example, the object-identifying module 206 uses cubic voxels to down-sample the cleaned point cloud to increase the efficiency of further processing the cleaned point cloud.

The object-identifying module 206, in further embodiments, localizes, e.g., geo-registers, the cleaned point cloud into world coordinates using a temporally-aligned mapping of the plurality of location data with the captured images. For example, the object-identifying module 206 can use INS location data that is temporally aligned with the cleaned point cloud data to geo-register the cleaned point cloud into work coordinates. In such an embodiment, each point in the cleaned point cloud is associated with latitude, longitude, and elevation values derived from a corresponding one of the plurality of location data and each point will have its latitude, longitude, altitude/elevation, or the like data registered to real-world coordinates.

In further embodiments, the object-identifying module 206 generates a surface model of the landing zone based on the localized/geo-registered point cloud. As used herein, the surface model can refer to a surface terrain of the landing zone. In such an embodiment, the object-identifying module 206 dynamically executes a surface terrain analysis on the surface model for further surface terrain processing of the landing zone to identify objects within the landing zone.

For example, in one embodiment, the object-identifying module 206 can apply a plane fitting algorithm for determining above-ground objects within the landing zone by fitting one or more planes to the localized point cloud using random sample consensus ("RANSAC") (assuming the landing zone is a flat surface).

In another example embodiment, the object-identifying module 206 applies a surface roughness algorithm for computing a surface roughness index ("SRI") of the landing zone to highlight corners and edges within the landing zone based on the localized point cloud. In such an example, the object-identifying module 206 computes the SRI using a 2.5D digital surface model to highlight the corners/edges on the ground.

In a further example embodiment, the object-identifying module 206 applies a surface normal algorithm for computing a surface normal for each point of the localized point cloud of the landing zone using singular value decomposition ("SVD"). In such an example, the object-identifying module 206 computes a surface normal for each point of the localized point cloud that generates a surface normal representation within the landing zone.

One of skill in the art will recognize, in light of this disclosure, other surface analysis algorithms that could be used to analyze the surface structure of the landing zone, such as landmark localization, three-dimensional intelligence, surveillance, and reconnaissance ("ISR"), runway survey, land survey, three-dimensional airport mapping, and/or the like. Furthermore, the generated surface model can be used in other applications such as disaster relief, weapon effectiveness analysis, and/or the like.

In further embodiments, the object-identifying module 206 can use various artificial intelligence/machine learning algorithms, such as supervised and unsupervised machine learning algorithms, to process the captured image data, generate point clouds, process and analyze the point clouds, and identify objects within the landing zone from the machine learning generated point clouds based on previously-generated historical or training data.

The output module 208, in certain embodiments, is configured to generate and provide one or more navigation instructions for avoiding one or more objects within the landing zone while the aircraft 110, 112 is landing. In one embodiment, the output module 208 can derive the navigation instructions from the surface model. The navigation instructions, in certain embodiments, include instructions for maneuvering the aircraft 110, 112 in a position that will avoid the objects in the landing zone, e.g., left, right, forward, back, up, down, slower, faster, higher, lower, and/or the like.

In some embodiment, the aircraft 110, 112 is autonomous, and the output module 208 transmits, sends, or otherwise provides the navigation instructions to a flight control system for the autonomous aircraft 110, 112 so that the autonomous aircraft 110, 112 can maneuver itself according to the navigation instructions to avoid the objects in the landing zone.

The output module 208, in some embodiments, provides a visual graphic of the surface model of the landing zone, e.g., on a display within the aircraft 110, 112. In certain embodiments, the visual graphic highlights the one or more identified objects within the landing zone such that the one or more identified objects are distinguishable from areas of the landing zone that are free of objects. For example, the output module 208 can mark the areas of the landing zone on a graphical representation of the landing zone presented on the display where the objects are located, where it is safe for the aircraft 110, 112 to land, and/or the like.

FIG. 3 depicts an example embodiment of a system 300 for landing zone evaluation, according to one or more examples of the subject disclosure. In one embodiment, the system 300 includes an aircraft 110, 112, e.g., a helicopter 301. The helicopter 301 includes two imaging sensors 302 that are coupled to the underside of the helicopter 301. The imaging sensors can include LIDAR cameras.

In one embodiment, one imaging sensors 302 is oriented along a generally horizontal axis A while another imaging sensor 302 is oriented along a generally vertical axis B. The imaging sensors 302 can be associated with (e.g., within the same housing) as a navigation sensor 304, such as an INS sensor that captures location data for the helicopter 301 at generally the same time as when images are captured using the LIDAR cameras.

In certain embodiments, the system 300 includes a landing apparatus 104, as described above, that is configured to capture and process the LIDAR images to identify one or more objects 308 in the landing zone 306 that are within a field of view 310 of the LIDAR cameras. The identified objects may include vehicles, people, structures, materials, pallets, crates, boxes, bags, containers, cones, construction materials, debris, and/or the like. The landing apparatus 104 can be located on board the helicopter 301, e.g., as part of a flight control system, can be located on the ground as part of a ground computing system 312, which is communicatively coupled to the helicopter 301 via a data network 106, and/or some combination of both.

The landing apparatus 104 uses the LIDAR images and the INS navigation/location data to identify objects 308 in the landing zone 306 and provide output to assist in avoiding the objects 308 while the helicopter 301 is landing. The output, for instance, can include navigation instructions/directions (e.g., provided to a pilot on board or remote from the helicopter, or an autonomous flight control system), a graphical or visual display of the landing area with the objects 308 highlighted, and/or the like, as shown in FIGS. 4A-4B.

Figure 4A:
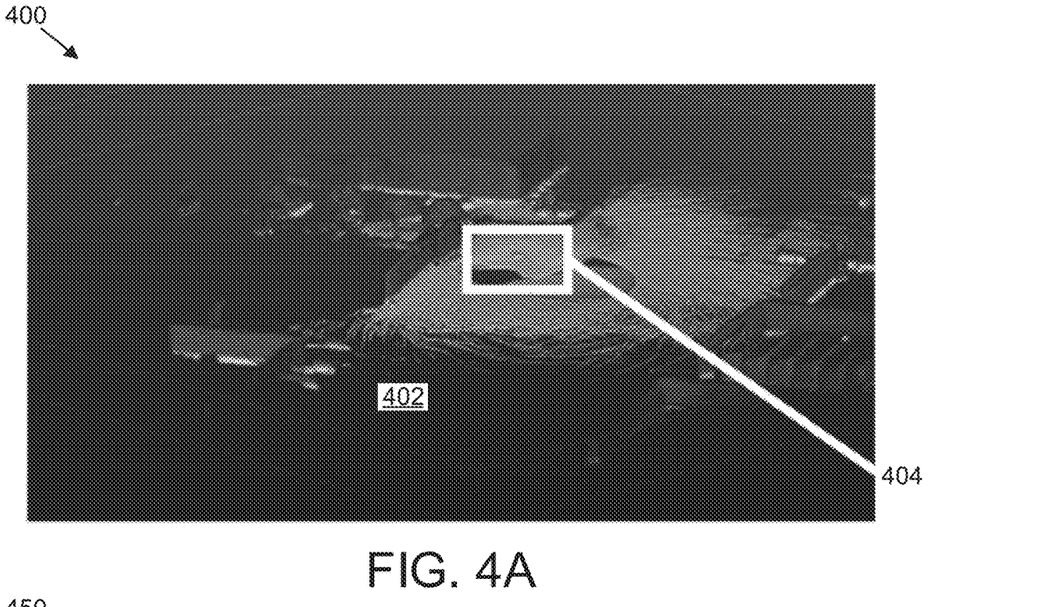
FIG. 4A depicts an example embodiment of output based on landing zone evaluation, according to one or more examples of the subject disclosure.

FIG. 4A depicts an example embodiment 400 of output based on landing zone evaluation, according to one or more examples of the subject disclosure. FIG. 4A depicts a point cloud 402 that the landing apparatus 104 has generated, processed, cleaned, and analyzed based on the images captured using the imaging sensors. In the example output, the landing apparatus 104 has identified at least one object 404 in the landing zone that the aircraft 110, 112 should avoid when landing. Accordingly, the landing apparatus 104 can generate and provide navigation instructions for the aircraft 110, 112, to avoid the object 404 while it is landing.

Figure 4B:
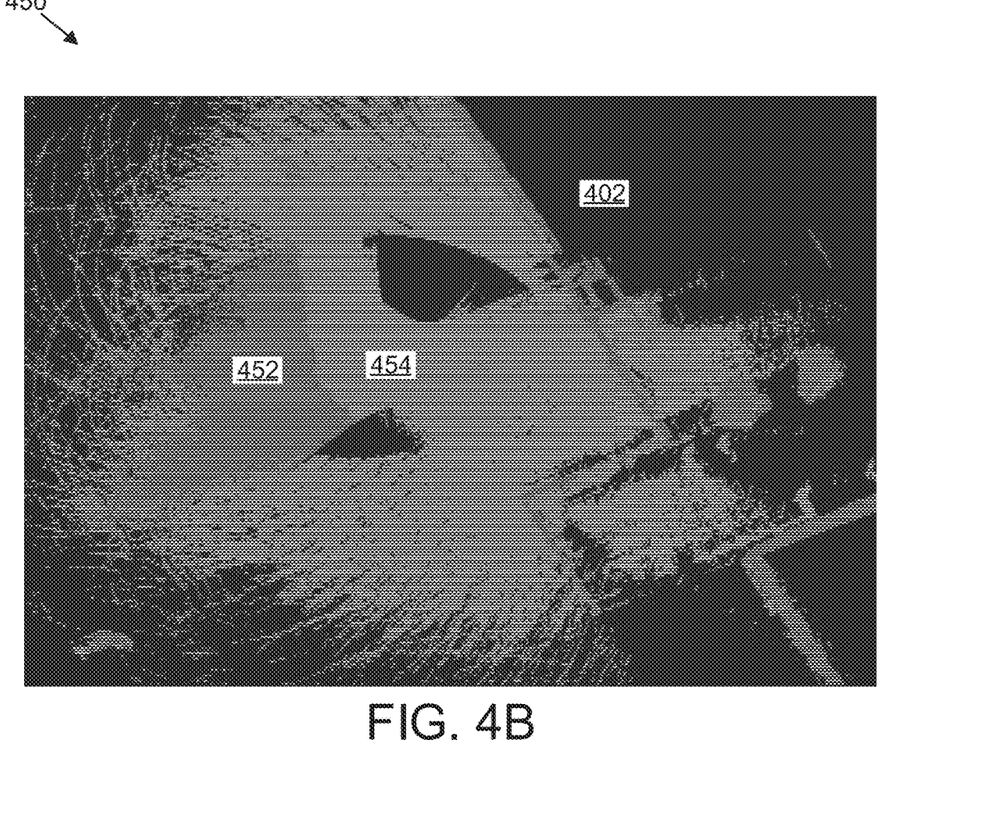
FIG. 4B depicts another example embodiment of output based on landing zone evaluation, according to one or more examples of the subject disclosure.

FIG. 4B depicts another example embodiment 450 of output based on landing zone evaluation, according to one or more examples of the subject disclosure. FIG. 4B depicts another point cloud 402 that highlights different areas of the landing zone based on the safety of landing the aircraft 110, 112 within those areas without hitting objects in the landing zone while landing. For instance, unsafe areas of the landing zone 452, e.g., areas with objects located within the landing zone, can be colored, or otherwise highlighted differently than safe areas of the landing zone 454, e.g., areas without objects located within the landing zone, so that a pilot or other controller of the aircraft 110, 112 can easily see whether there are objects in the landing zone and areas of the landing zone that should be avoided while landing.

Figure 5:
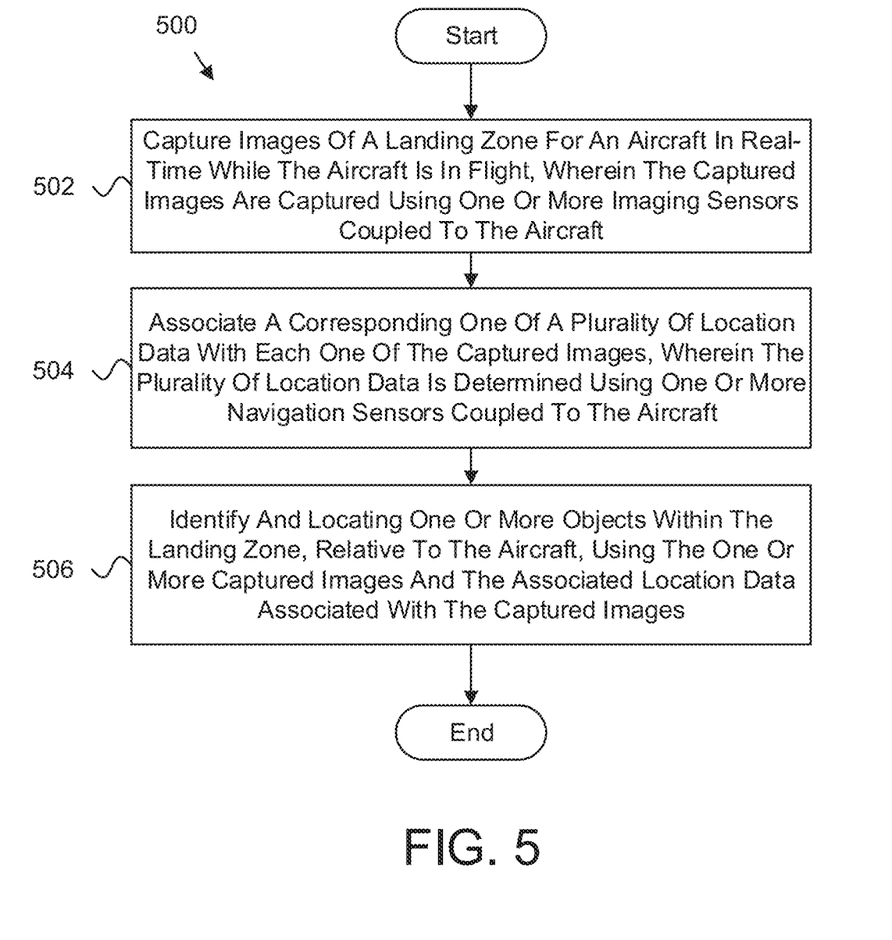
FIG. 5 is a schematic flow diagram of a method for landing zone evaluation, according to one or more examples of the subject disclosure.

FIG. 5 is a schematic flow diagram of a method 500 for landing zone evaluation, according to one or more examples of the subject disclosure. The method 500 begins and captures 502 images of a landing zone for an aircraft 110, 112 in real-time while the aircraft 110, 112 is in flight. The captured images are captured using one or more imaging sensors coupled to the aircraft 110, 112. The method 500 associates 504 a corresponding one of a plurality of location data with each one of the captured images. The plurality of location data is determined using one or more navigation sensors coupled to the aircraft 110, 112.

The method 500 identifies and locates 506 one or more objects within the landing zone, relative to the aircraft 110, 112, using the captured images and the location data associated with the captured images, and the method 500 ends. In certain embodiments, the imaging module 202, the location-determining module 204, and the object-identifying module 206 perform the various steps of the method 500.

Figure 6A:
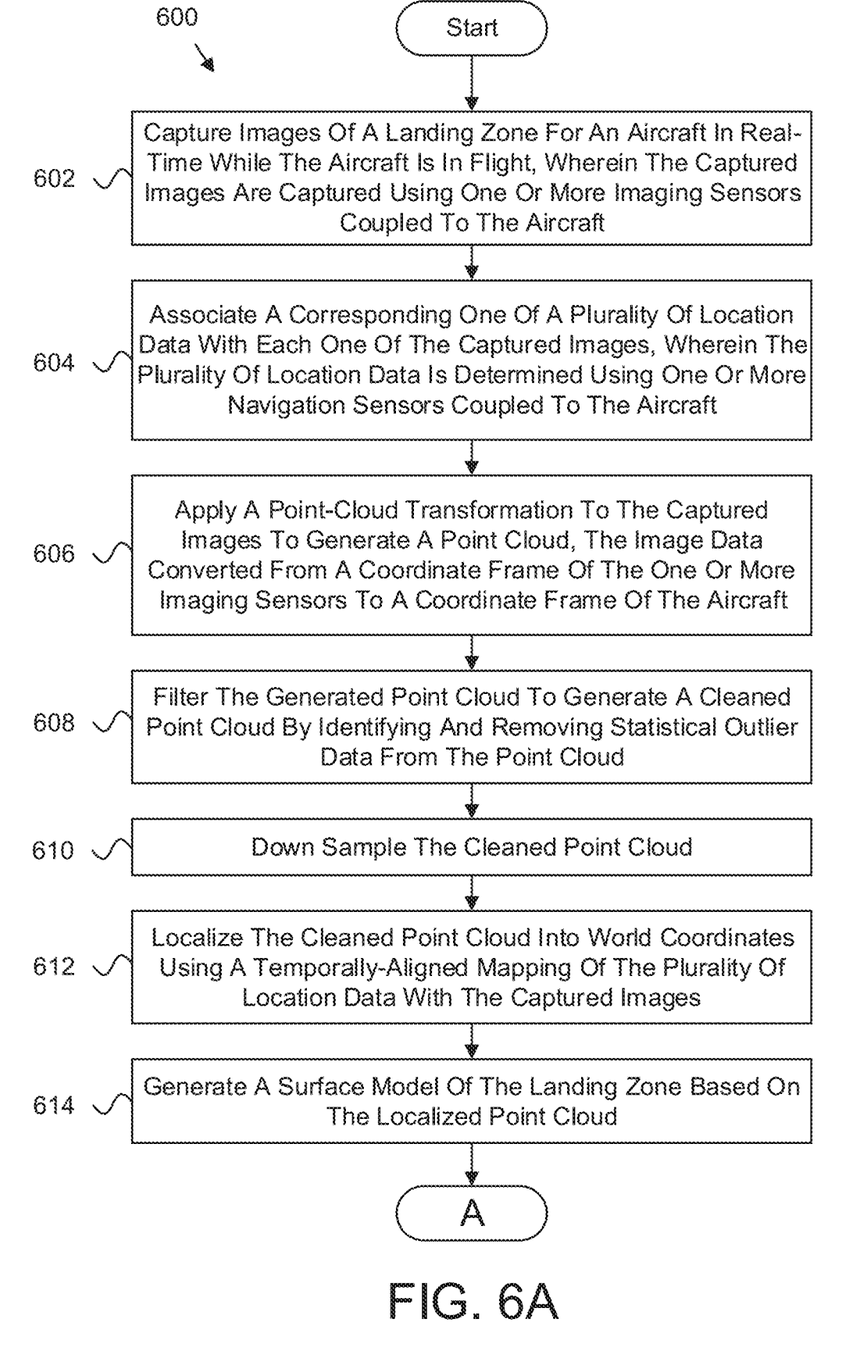
FIG. 6A is a first part of a schematic flow diagram of a method for landing zone evaluation, according to one or more examples of the subject disclosure.

FIG. 6A is a first part of a schematic flow diagram of a method 600 for landing zone evaluation, according to one or more examples of the subject disclosure. The method 600 begins and captures 602 images of a landing zone for an aircraft 110, 112 in real-time while the aircraft 110, 112 is in flight. The captured images are captured using one or more imaging sensors coupled to the aircraft 110, 112. The method 600 associates 604 a corresponding one of a plurality of location data with each one of the captured images. The plurality of location data is determined using one or more navigation sensors coupled to the aircraft 110, 112.

The method 600 applies 606 a point-cloud transformation to the captured images to generate a point cloud. The image data is converted from a coordinate frame of the one or more imaging sensors to a coordinate frame of the aircraft 110, 112. The method 600 filters 608 the generated point cloud to generate a cleaned point cloud by identifying and removing statistical outlier data from the point cloud.

The method 600 down-samples 610 the cleaned point cloud and localizes 612 the cleaned point cloud into world coordinates using a temporally aligned mapping of the location data with each of the captured images. Each point in the cleaned point cloud is associated with latitude, longitude, and elevation values derived from the location data. The method 600 generates 614 a surface model of the landing zone based on the localized point cloud. The surface model includes a surface terrain of the landing zone. One or more navigation instructions are derived from the surface model.

Figure 6B:
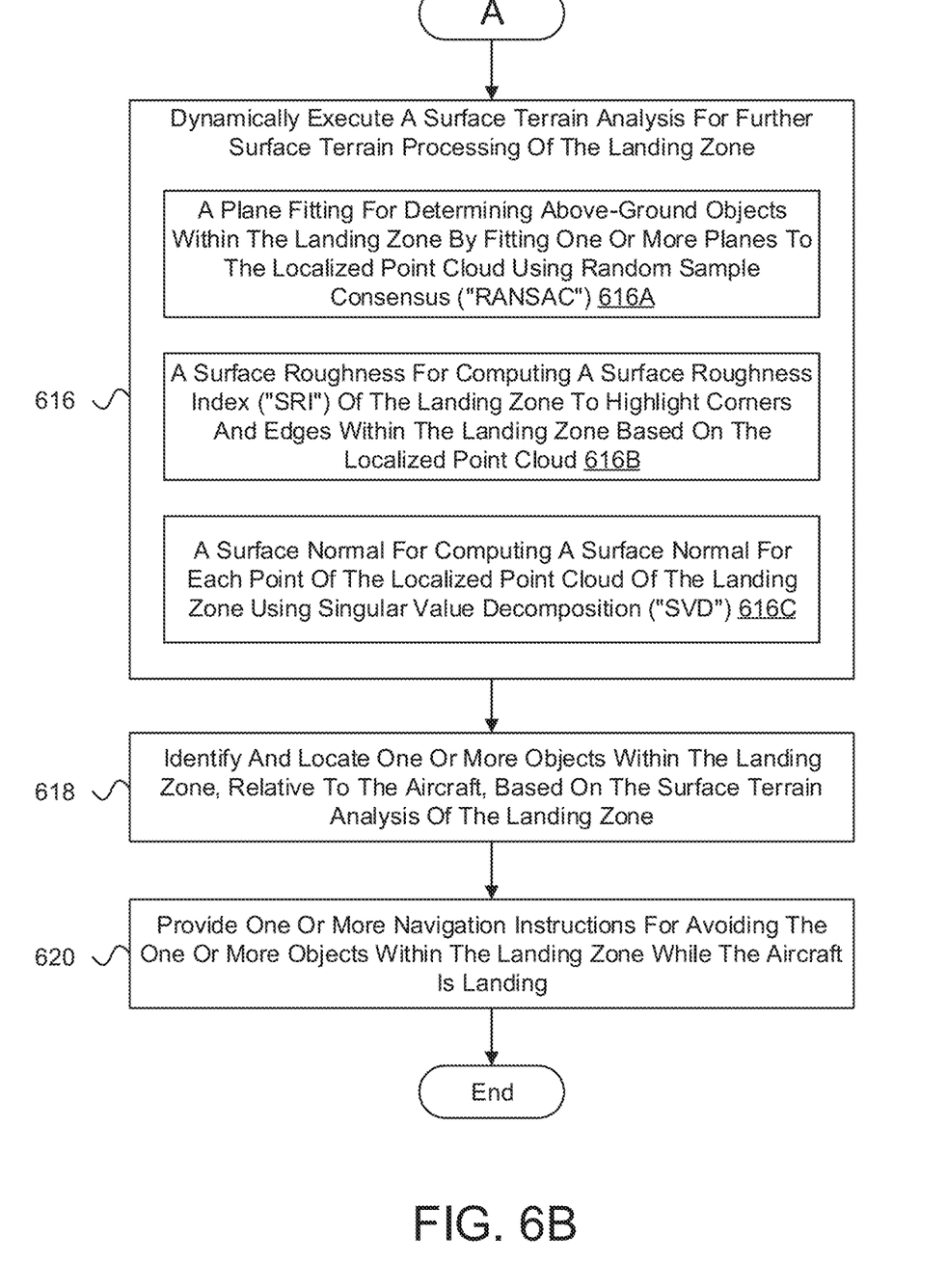
FIG. 6B is a continuation of the schematic flow diagram of FIG. 6A of a method for landing zone evaluation, according to one or more examples of the subject disclosure.

FIG. 6B is a continuation of the schematic flow diagram of FIG. 6A of a method 600 for landing zone evaluation, according to one or more examples of the subject disclosure. The method 600 continues and dynamically executes 616 a surface terrain analysis for further surface terrain processing of the landing zone. The surface terrain analysis can include a plane fitting 616A for determining above-ground objects within the landing zone by fitting one or more planes to the localized point cloud using random sample consensus ("RANSAC").

The surface terrain analysis can include a surface roughness 616B for computing a surface roughness index ("SRI") of the landing zone to highlight corners and edges within the landing zone based on the localized point cloud. The surface terrain analysis can include a surface normal 616C for computing a surface normal for each point of the localized point cloud of the landing zone using singular value decomposition ("SVD").

The method 600 identifies and locates 618 one or more objects within the landing zone, relative to the aircraft 110, 112, based on the surface terrain analysis. The method provides 620 one or more navigation instructions for avoiding the one or more objects within the landing zone while the aircraft 110, 112 is landing, and the method 600 ends. In certain embodiments, the imaging module 202, the location-determining module 204, the object-identifying module 206, and the output module 208 perform the various steps of the method 600.

Further, the disclosure comprises embodiments according to the following clauses:

Clause 1. A system, comprising:
one or more imaging sensors coupled to an aircraft;
one or more navigation sensors coupled to the aircraft proximate to the one or more imaging sensors;
an imaging module configured to capture images of a landing zone for the aircraft while the aircraft is in flight, wherein the captured images are captured using the one or more imaging sensors;
a location determining module configured to associate a corresponding one of a plurality of location data with each one of the captured images, wherein the plurality of location data is determined using the one or more navigation sensors coupled to the aircraft; and
an object-identifying module configured to identify and locate one or more objects within the landing zone, relative to the aircraft, using the captured images and the location data associated with the captured images.

Clause 2. The system of clause 1, wherein each one of the one or more imaging sensors is coupled to the aircraft adjacent to a corresponding navigation sensor of the one or more navigation sensors.

Clause 3. The system of any one of clauses 1 or 2, wherein an imaging sensor of the one or more imaging sensors and its corresponding navigation sensor are located adjacent to one another within a housing, the housing coupled to an underside of the aircraft Clause 4. The system of any one of clauses 1-3, wherein the imaging sensor and its corresponding navigation sensor are located no more than 0.5 meters apart from one another.

Clause 5. The system of any one of clauses 1-4, wherein the aircraft is an autonomous aircraft that processes one or more navigation instructions without user interaction to avoid the one or more objects within the landing zone.

Clause 6. The system of any one of clauses 1-5, wherein the aircraft comprises at least a first imaging sensor oriented along a horizontal plane and a second imaging sensor oriented along a vertical plane.

Clause 7. The system of any one of clauses 1-6, wherein a number and an orientation of the one or more imaging sensors is determined based on one or more specifications of the aircraft, the one or more specifications comprising at least one of a type of the aircraft, a size of the aircraft, a shape of the aircraft, or a configuration of a landing gear for the aircraft.

Clause 8. A method, comprising:
capturing images of a landing zone for an aircraft while the aircraft is in flight, wherein the captured images are captured using one or more imaging sensors coupled to the aircraft;
associating a corresponding one of a plurality of location data with each one of the captured images, wherein the plurality of location data is determined using one or more navigation sensors coupled to the aircraft; and
identifying and locating one or more objects within the landing zone, relative to the aircraft, using the captured images and the location data associated with the captured images.

Clause 9. The method of clause 8, further comprising:
applying a point-cloud transformation to the captured images to generate a point cloud by converting image data from a first coordinate frame of the one or more imaging sensors to a second coordinate frame of the aircraft;
filtering the generated point cloud to generate a cleaned point cloud by identifying and removing statistical outlier data from the point cloud; and
down sampling the cleaned point cloud Clause 10. The method of any one of clauses 8 or 9, further comprising localizing the cleaned point cloud into world coordinates using a temporally aligned mapping of the location data with each of the captured images, each point in the cleaned point cloud associated with latitude, longitude, and elevation values derived from the location data, wherein the localizing generates a localized point cloud Clause 11. The method of any one of clauses 8-10, further comprising generating a surface model of the landing zone based on the localized point cloud, the surface model comprising a surface terrain of the landing zone, wherein one or more navigation instructions are derived from the surface model Clause 12. The method of any one of clauses 8-11, further comprising providing one or more navigation instructions for avoiding the one or more objects within the landing zone while the aircraft is landing.

Clause 13. A computer program product comprising a computer-readable storage medium having program code embodied therein, the program code executable by a processor for:
receiving, from one or more imaging sensors coupled to an aircraft, images of a landing zone for the aircraft, wherein the images have been captured using the one or more imaging sensors while the aircraft is in flight;
associating a corresponding one of a plurality of location data with each one of the captured images, wherein the plurality of location data is determined using one or more navigation sensors coupled to the aircraft; and
identifying and locating one or more objects within the landing zone, relative to the aircraft, using the captured images and the location data associated with the captured images.

Clause 14. The computer program product of clause 13, wherein the program code is further executable by the processor for:
applying a point-cloud transformation to the captured images to generate a point cloud by converting image data from a first coordinate frame of the one or more imaging sensors to a second coordinate frame of the aircraft;
filtering the generated point cloud to generate a cleaned point cloud by identifying and removing statistical outlier data from the point cloud; and
down sampling the cleaned point cloud.

Clause 15. The computer program product of any one of clauses 13 or 14, wherein the program code is further executable by the processor for localizing the cleaned point cloud into world coordinates using a temporally-aligned mapping of the plurality of location data with the captured images, wherein the localizing generates a localized point cloud; and
each point in the cleaned point cloud is associated with latitude, longitude, and elevation values derived from a corresponding one of the plurality of location data.

Clause 16. The computer program product of any one of clauses 13-15, wherein the program code is further executable by the processor for generating a surface model of the landing zone based on the localized point cloud, wherein the surface model comprises a surface terrain model of the landing zone, and one or more navigation instructions are derived from the surface model.

Clause 17. The computer program product of any one of clauses 13-16, wherein the program code is further executable by the processor for providing a visual graphic of the surface model of the landing zone, the visual graphic highlighting the one or more identified objects within the landing zone such that the one or more identified objects are distinguishable from areas of the landing zone that are free of objects.

Clause 18. The computer program product of any one of clauses 13-17, wherein the program code is further executable by the processor for executing a surface terrain analysis for further surface terrain processing of the landing zone.

Clause 19. The computer program product of any one of clauses 13-18, wherein the surface terrain analysis comprises one or more of:
a plane fitting for determining above-ground objects within the landing zone by fitting one or more planes to the localized point cloud using random sample consensus ("RANSAC");
a surface roughness for computing a surface roughness index ("SRI") of the landing zone to highlight corners and edges within the landing zone based on the localized point cloud; and
a surface normal for computing a surface normal for each point of the localized point cloud of the landing zone using singular value decomposition ("SVD").

Clause 20. The computer program product of any one of clauses 13-19, wherein the program code is further executable by the processor for determining and providing one or more navigation instructions for avoiding the one or more objects within the landing zone while the aircraft is landing.

In the above description, certain terms can be used such as "up," "down," "upper," "lower," "horizontal," "vertical," "left," "right," "over," "under" and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," "containing," "consisting," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of," when used with a list of items, means different combinations of one or more of the listed items can be used and only one of the items in the list can be needed. The item can be a particular object, thing, or category. In other words, "at least one of" means any combination of items or number of items can be used from the list, but not all of the items in the list can be required. For example, "at least one of item A, item B, and item C" can mean item A; item A and item B; item B; item A, item B, and item C; or item B and item C. In some cases, "at least one of item A, item B, and item C" can mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function can additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods can be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types can be employed in the flow chart diagrams, they are understood not to limit the scope of the corresponding method. Indeed, some arrows or other connectors can be used to indicate only the logical flow of the method. For instance, an arrow can indicate a waiting or monitoring period of unspecified duration between enumerated steps of the depicted method. Additionally, the order in which a particular method occurs may or may not strictly adhere to the order of the corresponding steps shown.

Embodiments of the various modules can take the form of an entirely hardware embodiment, an entirely software embodiment (including firmware, resident software, microcode, etc.) or an embodiment combining software and hardware aspects that can all generally be referred to herein as a "circuit," "module" or "system." Furthermore, embodiments can take the form of a program product embodied in one or more computer readable storage devices storing machine readable code, computer readable code, and/or program code, referred hereafter as code. The storage devices can be tangible, non-transitory, and/or non-transmission. The storage devices may not embody signals. In a certain embodiment, the storage devices only employ signals for accessing code.

The modules can be implemented as a hardware circuit comprising custom very-large-scale integration (VLSI) circuits or gate arrays, off-the-shelf semiconductors such as logic chips, transistors, or other discrete components. The modules can also be implemented in programmable hardware devices such as field programmable gate arrays, programmable array logic, programmable logic devices or the like.

The modules can also be implemented in code and/or software for execution by various types of processors. An identified module of code can, for instance, comprise one or more physical or logical blocks of executable code which can, for instance, be organized as an object, procedure, or function. Nevertheless, the executables of an identified module need not be physically located together but can comprise disparate instructions stored in different locations which, when joined logically together, comprise the module and achieve the stated purpose for the module.

Indeed, a module of code can be a single instruction, or many instructions, and can even be distributed over several different code segments, among different programs, and across several memory devices. Similarly, operational data can be identified and illustrated herein within modules and can be embodied in any suitable form and organized within any suitable type of data structure. The operational data can be collected as a single data set or can be distributed over different locations including over different computer readable storage devices. Where a module or portions of a module are implemented in software, the software portions are stored on one or more computer readable storage devices.

Any combination of one or more computer readable medium can be utilized by the modules. The computer readable medium can be a computer readable storage medium. The computer readable storage medium can be a storage device storing the code. The storage device can be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium can be any tangible medium that can contain or store a program for use by or in connection with an instruction execution system, apparatus, or device.

Code for carrying out operations for embodiments can be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The disclosed subject matter can be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system, comprising:
   one or more imaging sensors coupled to an aircraft;
   one or more navigation sensors coupled to the aircraft proximate to the one or more imaging sensors;
   an imaging module configured to capture images of a landing zone for the aircraft while the aircraft is in flight, wherein the captured images are captured using the one or more imaging sensors;
   a location determining module configured to associate a corresponding one of a plurality of location data with each one of the captured images, wherein the plurality of location data is determined using the one or more navigation sensors coupled to the aircraft; and
   an object-identifying module configured to apply a point-cloud transformation to the captured images to generate a point cloud by converting image data from a first coordinate frame of the one or more imaging sensors to a second coordinate frame of the aircraft, and to identify and locate one or more objects within the landing zone, relative to the aircraft, using the captured images, the location data associated with the captured images, and the point cloud.

2. The system of claim 1, wherein each one of the one or more imaging sensors is coupled to the aircraft adjacent to a corresponding navigation sensor of the one or more navigation sensors.

3. The system of claim 2, wherein an imaging sensor of the one or more imaging sensors and its corresponding navigation sensor are located adjacent to one another within a housing, the housing coupled to an underside of the aircraft.

4. The system of claim 3, wherein the imaging sensor and its corresponding navigation sensor are located no more than 0.5 meters apart from one another.

5. The system of claim 1, wherein the aircraft is an autonomous aircraft that processes one or more navigation instructions without user interaction to avoid the one or more objects within the landing zone.

6. The system of claim 1, wherein the aircraft comprises at least a first imaging sensor oriented along a horizontal plane and a second imaging sensor oriented along a vertical plane.

7. The system of claim 1, wherein a number and an orientation of the one or more imaging sensors is determined based on one or more specifications of the aircraft, the one or more specifications comprising at least one of a type of the aircraft, a size of the aircraft, a shape of the aircraft, or a configuration of a landing gear for the aircraft.

8. A method, comprising:
   capturing images of a landing zone for an aircraft while the aircraft is in flight, wherein the captured images are captured using one or more imaging sensors coupled to the aircraft;
   associating a corresponding one of a plurality of location data with each one of the captured images, wherein the plurality of location data is determined using one or more navigation sensors coupled to the aircraft;
   applying a point-cloud transformation to the captured images to generate a point cloud by converting image data from a first coordinate frame of the one or more imaging sensors to a second coordinate frame of the aircraft; and
   identifying and locating one or more objects within the landing zone, relative to the aircraft, using the captured images, the location data associated with the captured images, and the point cloud.

9. The method of claim 8, further comprising:
   filtering the generated point cloud to generate a cleaned point cloud by identifying and removing statistical outlier data from the point cloud; and
   down sampling the cleaned point cloud.

10. The method of claim 9, further comprising localizing the cleaned point cloud into world coordinates using a temporally aligned mapping of the location data with each of the captured images, each point in the cleaned point cloud associated with latitude, longitude, and elevation values derived from the location data, wherein the localizing generates a localized point cloud.

11. The method of claim 10, further comprising generating a surface model of the landing zone based on the localized point cloud, the surface model comprising a surface terrain of the landing zone, wherein one or more navigation instructions are derived from the surface model.

12. The method of claim 8, further comprising providing one or more navigation instructions for avoiding the one or more objects within the landing zone while the aircraft is landing.

13. A computer program product comprising a computer-readable storage medium having program code embodied therein, the program code executable by a processor for:
   receiving, from one or more imaging sensors coupled to an aircraft, images of a landing zone for the aircraft, wherein the images have been captured using the one or more imaging sensors while the aircraft is in flight;

associating a corresponding one of a plurality of location data with each one of the captured images, wherein the plurality of location data is determined using one or more navigation sensors coupled to the aircraft;

applying a point-cloud transformation to the captured images to generate a point cloud by converting image data from a first coordinate frame of the one or more imaging sensors to a second coordinate frame of the aircraft; and identifying and locating one or more objects within the landing zone, relative to the aircraft, using the captured images, the location data associated with the captured images, and the point cloud.

14. The computer program product of claim 13, wherein the program code is further executable by the processor for:

filtering the generated point cloud to generate a cleaned point cloud by identifying and removing statistical outlier data from the point cloud; and down sampling the cleaned point cloud.

15. The computer program product of claim 14, wherein:

the program code is further executable by the processor for localizing the cleaned point cloud into world coordinates using a temporally-aligned mapping of the plurality of location data with the captured images, wherein the localizing generates a localized point cloud; and each point in the cleaned point cloud is associated with latitude, longitude, and elevation values derived from a corresponding one of the plurality of location data.

16. The computer program product of claim 15, wherein the program code is further executable by the processor for generating a surface model of the landing zone based on the localized point cloud, wherein the surface model comprises a surface terrain model of the landing zone, and one or more navigation instructions are derived from the surface model.

17. The computer program product of claim 16, wherein the program code is further executable by the processor for providing a visual graphic of the surface model of the landing zone, the visual graphic highlighting the one or more identified objects within the landing zone such that the one or more identified objects are distinguishable from areas of the landing zone that are free of objects.

18. The computer program product of claim 16, wherein the program code is further executable by the processor for executing a surface terrain analysis for further surface terrain processing of the landing zone.

19. The computer program product of claim 18, wherein the surface terrain analysis comprises one or more of:

a plane fitting for determining above-ground objects within the landing zone by fitting one or more planes to the localized point cloud using random sample consensus ("RANSAC");

a surface roughness for computing a surface roughness index ("SRI") of the landing zone to highlight corners and edges within the landing zone based on the localized point cloud; and a surface normal for computing a surface normal for each point of the localized point cloud of the landing zone using singular value decomposition ("SVD").

20. The computer program product of claim 13, wherein the program code is further executable by the processor for determining and providing one or more navigation instructions for avoiding the one or more objects within the landing zone while the aircraft is landing.

* * * * *